(12) United States Patent  
Kikkawa

(10) Patent No.: US 12,070,121 B2  
(45) Date of Patent: Aug. 27, 2024

(54) INTERDENTAL CLEANING TOOL

(71) Applicant: KOBAYASHI PHARMACEUTICAL CO., LTD., Osaka (JP)

(72) Inventor: Tasuku Kikkawa, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 948 days.

(21) Appl. No.: 17/050,557

(22) PCT Filed: Apr. 26, 2019

(86) PCT No.: PCT/JP2019/017970  
§ 371 (c)(1),  
(2) Date: Jun. 2, 2021

(87) PCT Pub. No.: WO2019/208784  
PCT Pub. Date: Oct. 31, 2019

(65) Prior Publication Data  
US 2021/0289934 A1    Sep. 23, 2021

(30) Foreign Application Priority Data  
Apr. 27, 2018 (JP) .................... 2018-087034

(51) Int. Cl.  
*A46B 9/04* (2006.01)  
*A46B 3/04* (2006.01)

(52) U.S. Cl.  
CPC .............. *A46B 9/045* (2013.01); *A46B 3/04* (2013.01); *A46B 2200/108* (2013.01)

(58) Field of Classification Search  
CPC ..... A46B 9/045; A46B 3/04; A46B 2200/108; A61C 15/02  
See application file for complete search history.

(56) References Cited

U.S. PATENT DOCUMENTS

| | | |
|---|---|---|
| 3,775,848 A | 12/1973 | Barnett |
| 5,775,346 A | 7/1998 | Szyszkowski |
| 2003/0027101 A1 | 2/2003 | Victoria |

(Continued)

FOREIGN PATENT DOCUMENTS

| | | | |
|---|---|---|---|
| DE | 102016007658 A1 * | 12/2017 | ............... A46B 9/06 |
| GB | 2557262 A | 6/2018 | |

(Continued)

OTHER PUBLICATIONS

International Search Report for International Application No. PCT/JP2019/017970 dated Jul. 9, 2019 (2 sheets, 2 sheets translation, 4 sheets total).

(Continued)

*Primary Examiner* — Shay Karls  
(74) *Attorney, Agent, or Firm* — Kratz, Quintos & Hanson, LLP

(57) ABSTRACT

An interdental cleaning tool that is easily insertable in an interdental space by a user and has a high cleaning capability includes a base portion including a shaft portion having a shape insertable in an interdental space, and a cleaning portion that covers at least a portion of the shaft portion and is capable of cleaning an interdental space. The shaft portion has a triangular cross section on an orthogonal plane perpendicularly intersecting an axial direction of the shaft portion.

3 Claims, 5 Drawing Sheets

(56) References Cited

U.S. PATENT DOCUMENTS

| | | |
|---|---|---|
| 2015/0114418 A1 | 4/2015 | Zmiyiwsky |
| 2015/0114428 A1 | 4/2015 | Kato |
| 2016/0058531 A1 | 3/2016 | Adriano |
| 2017/0189148 A1 | 7/2017 | Kato |
| 2018/0250104 A1 | 9/2018 | Adriano |
| 2019/0183617 A1 | 6/2019 | Potsch |

FOREIGN PATENT DOCUMENTS

| | | | |
|---|---|---|---|
| JP | S49-077489 A | 7/1974 | |
| JP | 2016-521159 A | 7/2016 | |
| WO | 2013/176297 A1 | 11/2013 | |
| WO | WO-2014167592 A1 * | 10/2014 | ............. A46B 3/005 |

OTHER PUBLICATIONS

Extended European Search Report for European Patent Application No. 19793979.6 issued May 14, 2021 (8 sheets).

* cited by examiner

INTERDENTAL CLEANING TOOL

TECHNICAL FIELD

The present invention relates to an interdental cleaning tool.

BACKGROUND ART

Conventionally, an interdental cleaning tool for cleaning an interdental space is known. For example, Patent Literature 1 discloses an interdental cleaning tool including a base structure portion made of synthetic resin, and a soft portion made of elastomer. The base structure portion includes a core base structure portion having a shape of a round bar insertable in an interdental space, and a handling base structure portion having a shape that can be held by fingers. The soft portion includes a covering portion that covers a portion of an outer circumferential surface of the core base structure portion, and a plurality of protruding portions each protruding outward from an outer circumferential surface of the covering portion.

CITATION LIST

Patent Literature

Patent Literature 1: WO 2013/176297 A

SUMMARY OF INVENTION

Problems to be Solved by the Invention

Using a technique disclosed in Patent Literature 1, it is difficult to achieve both easy insertion of an interdental cleaning tool in an interdental space and improvement in an effect of cleaning side surfaces of adjacent teeth. That is, these requirements for the interdental cleaning tool conflict each other in terms of a dimension of an inserting portion formed of a core base structure portion and a soft portion covering the core base structure portion. For easy insertion of the interdental cleaning tool in the interdental space, it is preferable that the core base structure portion and the covering portion covering the core base structure portion are made thin. Meanwhile, in order to improve the cleaning effect, it is preferable that these parts are made thick. Thus, a conventional technique cannot fully satisfy the requirement for easy insertion in the interdental space and the requirement for a high cleaning effect.

An object of the present invention is to provide an interdental cleaning tool that is easily insertable in an interdental space by a user and has a high cleaning capability.

Solution to Problem

An interdental cleaning tool according to an aspect of the present invention includes a base portion including a shaft portion having a shape insertable in an interdental space, and a cleaning portion that covers at least a portion of the shaft portion and is capable of cleaning an interdental space. The shaft portion has a triangular cross section on an orthogonal plane perpendicularly intersecting an axial direction of the shaft portion.

In the configuration, since the shaft portion has the triangular cross section, the cross-section of the shaft portion approximately matches a triangular space (a space defined by adjacent teeth and gum (hereinafter referred to as oral tissues)). Thus, without preventing easy insertion of the interdental cleaning tool in the triangular space, the shaft portion takes up a wider area in the triangular space than a conventional base structure portion having a shape of a round bar. The remaining area between the shaft portion and the oral tissues is smaller than that between a conventional base structure portion and the oral tissues, so that the cleaning portion covering the shaft portion tightly contacts the oral tissues to cause a high cleaning effect.

In the configuration, the cleaning portion may include a cleaning portion body that covers at least a portion of the shaft portion and has a lower hardness than the shaft portion. The cleaning portion body may have a triangular cross section on the orthogonal plane.

In the configuration, the cross-section of the cleaning portion body on the orthogonal plane is a circle, and thus does not match the shape of the triangular space. However, since the cleaning portion body has a lower hardness than the shaft portion, the cleaning portion body can compressively deform to fit the shape of the triangular space when the interdental cleaning tool is inserted in the triangular space. The cleaning portion body has a thick compressively deformable layer at a portion corresponding to (in particular, at a center of) a side of the triangular cross-section of the shaft portion. The thick compressively deformable layer contacts the oral tissue with a greater force than other portions on the orthogonal plane, and thus contributes to effective removal of the deposits from the oral tissues.

In the configuration, the cleaning portion may include a cleaning portion body that covers at least a portion of the shaft portion. The cleaning portion body has a triangular cross section on the orthogonal plane vertexes of the triangular cross section are respectively on three virtual lines passing a central axis of the shaft portion and respective three vertexes of the triangular cross-section of the shaft portion.

In the configuration, since the triangular cross-section of the cleaning portion body on the orthogonal plane and their vertexes are respectively on three virtual lines passing the central axis of the shaft portion and the respective three vertexes of the triangular cross-section of the shaft portion, the cleaning portion has a shape which approximately matches the triangular space like the shaft portion. The cleaning portion which at least partially covers the shaft portion approximately uniformly fills the area between the oral tissues defining the triangular space and the shaft portion inserted in the triangular space, so that the cleaning portion can contact the oral tissues forming the triangular space with an approximately uniform force.

In the configuration, the cleaning portion may further include a brush portion having a shape protruding outward from the outer circumferential surface of the cleaning portion body. The brush portion may include a plurality of bristles each protruding outward from the outer circumferential surface of the cleaning portion body over a virtual plane encompassing the central axis of the shaft portion and a ridge line of an outer circumferential surface of the shaft portion.

With such a configuration, the ridge line of the outer circumferential surface of the shaft portion faces a corner of the triangular space when the shaft portion is inserted in the triangular space. Since each of a plurality of bristles protruding outward from the outer circumferential surface of the cleaning portion body which at least partially covers the shaft portion protrudes from the outer circumferential surface of the cleaning portion body over the virtual plane encompassing the central axis of the shaft portion and the ridge line of the outer circumferential surface of the shaft portion, the bristles can reach the corner of the triangular space, and thus can effectively scrape out the deposit.

In the configuration, the cross-section of the shaft portion on the orthogonal plane may be an isosceles triangle.

In the configuration where the triangular cross-section of the shaft portion is an isosceles triangle, there is no excessively large difference in area size between the side surface of the left tooth of the triangular space to be cleaned and the shaft portion, and between the side surface of the right tooth of the triangular space to be cleaned and the shaft portion. Thus, the interdental cleaning tool can approximately uniformly clean the left and right teeth that form the triangular space.

In the configuration, the base portion may include a grip portion that is connected to the shaft portion and have a shape that can be held by fingers. The grip portion may have a larger dimension in a first direction perpendicularly intersecting the axial direction than in a second direction perpendicularly intersecting both the axial direction and the first direction. One of three sides of the triangle of the cross-section of the shaft portion may perpendicularly intersect the first direction.

In the configuration, when the grip portion held by the fingers of a user has a small dimension in the second direction and a large dimension in the first direction, the user who wants to clean a triangular space defined between a pair of posterior teeth often holds the grip portion with the fingers so that the first direction having a large dimension is approximately vertical. When the grip portion is held with the first direction being approximately vertical, the side of the triangular cross-section of the shaft portion extends along an upper rim of the gum forming the triangular space, the side of the triangle perpendicularly intersecting the first direction. The other two sides are positioned along the side surfaces of a pair of the posterior teeth. Thus, the posture of the cross-section of the shaft portion approximately matches the posture of the triangular space between the posterior teeth, and the user can easily clean the triangular space between the posterior teeth.

In the configuration, the cleaning portion may be made of a composite material containing elastomer and a reinforcing material.

Since the cleaning portion having the configuration is made of a composite material containing elastomer and a reinforcing material, the brush portion has a higher rigidity than a conventional cleaning portion made only of elastomer, and thus the triangular space can be effectively cleaned.

Advantageous Effects of Invention

An interdental cleaning tool described above is easily insertable in an interdental space by a user and has a high cleaning capability.

DESCRIPTION OF EMBODIMENT

First Embodiment

Figure 1:
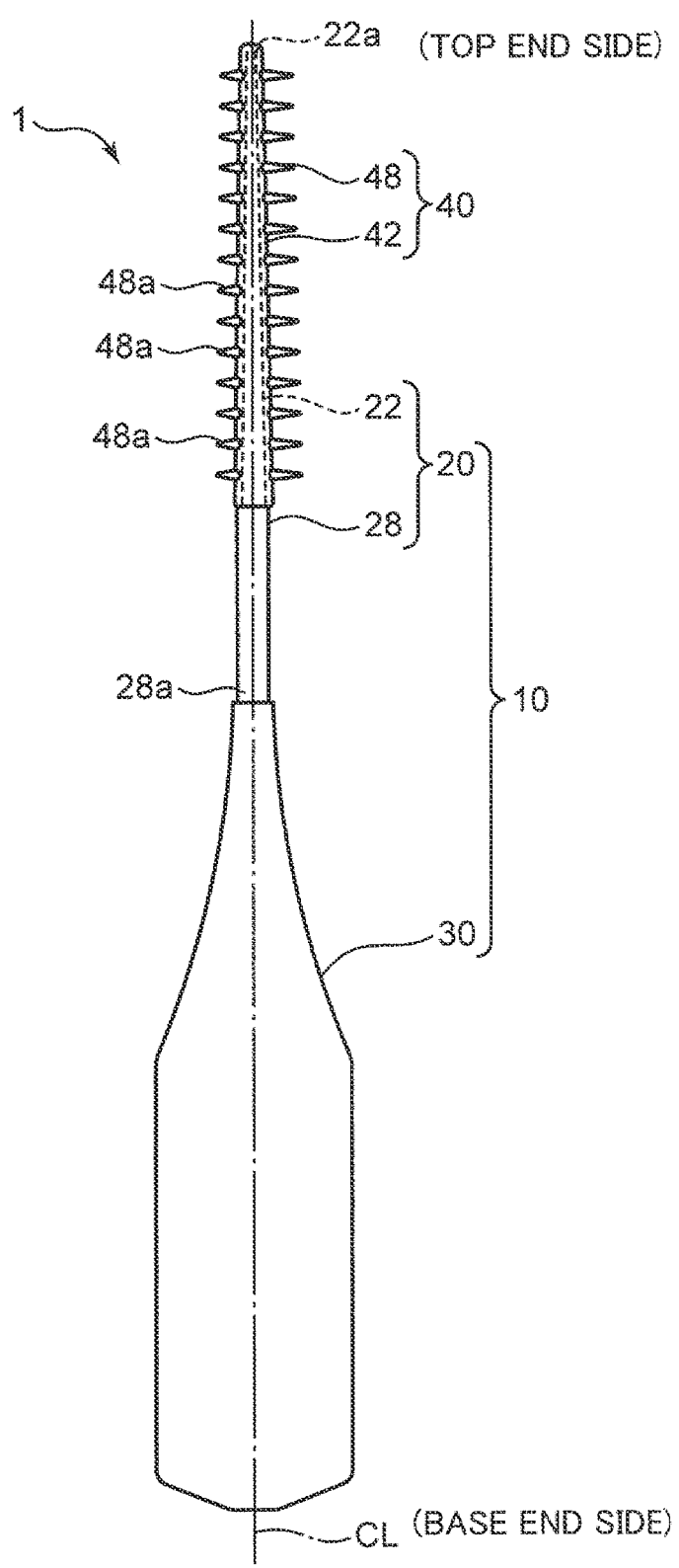
FIG. 1 is a schematic front view of an interdental cleaning tool according to the first embodiment.

FIG. 1 is a schematic front view of an interdental cleaning tool 1 according to the first embodiment. With reference to FIG. 1, the interdental cleaning tool 1 will be described.

In FIG. 1, a term "base end side" and a term "top end side" are given. The term "base end side" indicates a side close to fingers of a user when the interdental cleaning tool 1 is held by the user. The term "top end side" indicates the opposite side of the base end side. A structure of the interdental cleaning tool 1 will be described using these terms as reference. The terms given in FIG. 1 are used only for clarifying the description and not by means of limiting the interpretation.

The interdental cleaning tool 1 includes a base portion 10 of which base end side can be held by the fingers of the user and top end side is insertable in an interdental space by the user, and a cleaning portion 40 that covers the top end portion of the base portion 10. The base portion 10 provides the interdental cleaning tool 1 with a suitable hardness to prevent the interdental cleaning tool 1 from unnecessarily bending when inserted in the interdental space. The cleaning portion 40 covering the top end portion of the base portion 10 is made of a material having a lower hardness than the base portion 10, and prevents the hard base portion 10 from directly making contact with the oral tissues forming the triangular space (that is, the teeth and the gum). In addition, the cleaning portion 40 is formed to directly contact the oral tissues and scrape out the deposit from the oral tissues. The top end portion of the base portion 10 covered by the cleaning portion 40 having a suitable hardness as described above serves as a core material that prevents the cleaning portion 40 from unnecessarily bending when the interdental cleaning tool 1 is inserted in the triangular space. The base portion 10 and the cleaning portion 40 will be described below.

The base portion 10 is made of a synthetic resin such as polypropylene, polyethylene, ABS, polybutylene terephthalate, polycarbonate, polyethylene terephthalate, polystyrene, and polyacetal. In the embodiment, the base portion 10 is made of polypropylene.

To describe the shape of the base portion 10, a central axis CL extending from the base end side to the top end side (or in the opposite direction) is illustrated in FIG. 1. Hereinafter in the description, the extending direction of the central axis CL is referred to as "axial direction".

Figure 2:
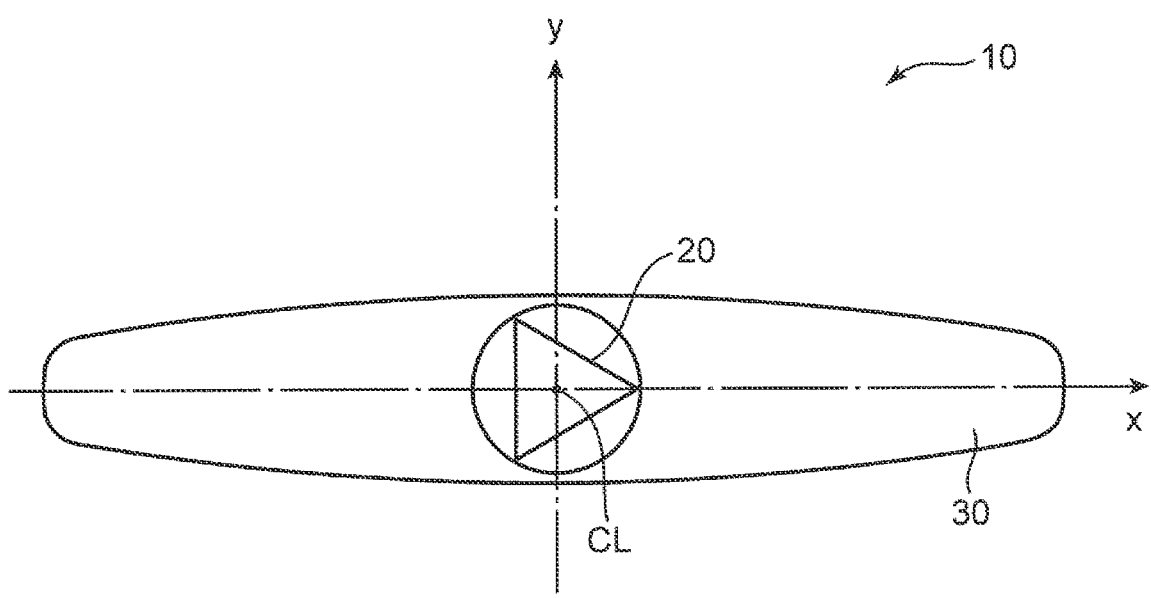
FIG. 2 is a schematic plan view of a base portion of the interdental cleaning tool.

FIG. 2 is a schematic plan view of the base portion 10. The shape of the base portion 10 will be described below with reference to FIGS. 1 and 2.

FIG. 2 illustrates x-axis and y-axis that intersect each other on the central axis CL. The central axis CL perpendicularly intersects both the x-axis and the y-axis. In the description below, the extending direction of the x-axis is referred to as "first direction" whereas the extending direction of the y-axis is referred to as "second direction". The extending directions of the x-axis, the y-axis, and the central axis CL are used only by means of clarifying the description on the base portion 10, not by means of limiting the interpretation.

The base portion 10 includes a shaft portion 20 provided in the top end side, and a grip portion 30 provided in the base end side (see FIG. 1). The shaft portion 20 and the grip portion 30 are integrally molded with a synthetic resin described above.

The grip portion 30 described in FIG. 2 is symmetric about the x-axis and the y-axis. The dimension of the grip portion 30 along the x-axis is larger than the dimension of the grip portion 30 along the y-axis. That is, the grip portion 30 has a form of a plate which is thin in the second direction.

The shaft portion 20 extending from the grip portion 30 along the central axis CL toward the top end side is longer in the axial direction than the grip portion 30. An end portion at which the shaft portion 20 is connected to the grip portion 30 is hereinafter referred to as "base end portion 28a". An end portion of the shaft portion 20 opposite to the base end portion 28a is hereinafter referred to as "insertion end portion 22a".

A predetermined section of the shaft portion 20 from the insertion end portion 22a toward the base end side is covered by the cleaning portion 40. The section covered by the cleaning portion 40 is hereinafter referred to as "covered section 22". The section of the shaft portion 20 other than the "covered section 22" is an exposed section 28 which is not covered by the cleaning portion 40. In the embodiment, the covered section 22 has approximately the same length in the axial direction as the exposed section 28.

The shaft portion 20 has a tapered shape gradually becoming thinner from the base end portion 28a toward the insertion end portion 22a. The shaft portion 20 has a triangular cross-section on a virtual orthogonal plane encompassing the x-axis and the y-axis. The triangular cross-section is formed throughout the section from the base end portion 28a to the insertion end portion 22a. Thus, the shaft portion 20 generally has a shape of a truncated triangular pyramid.

The posture of the cross-section of the shaft portion 20 relative to the grip portion 30 is determined so that one of the three vertexes of the triangular cross-section of the shaft portion 20 is on the x-axis and the side opposing the corner on the x-axis perpendicularly intersects the x-axis. In the embodiment, the cross-section of the shaft portion 20 is approximately an isosceles triangle, and the posture and the shape of the cross-section of the shaft portion 20 are determined so that the base of the isosceles triangle perpendicularly intersects the x-axis and the other two sides have the same length. However, the cross-section of the shaft portion 20 may be another type of triangle.

The cleaning portion 40 covering the covered section 22 of the shaft portion 20 is made of a composite material having a lower hardness than the synthetic resin used for molding the base portion 10. The composite material mainly contains elastomer material such as styrene elastomer, silicone, olefinic elastomer, and polyester elastomer. A small amount of a reinforcing material such as glass fibers and talc is added to the elastomer material. The composite material preferably contains the reinforcing material by 3% by weight to 50% by weight, inclusive, more preferably 5% by weight to 35% by weight, inclusive.

The cleaning portion 40 made of a composite material described above includes a cleaning portion body 42 covering the entire covered section 22 of the shaft portion 20, and a brush portion 48 protruding outward from an outer circumferential surface of the cleaning portion body 42. The cleaning portion body 42 prevents a direct contact between the oral tissues and the hard shaft portion 20. The brush portion 48 includes bristles 48a each having a form of a thin projection protruding from the outer circumferential surface of the cleaning portion body 42. The bristles 48a elastically deform in an oral cavity when the covered section 22 of the shaft portion 20 is inserted in the interdental space and recovers the shape when the covered section 22 has passed the interdental space. As a result, the bristles 48a can effectively scrape out the deposit from the oral tissues. At least a portion of the bristles 48a is located in relation with the triangular shape of the cross-section of the shaft portion 20.

Figure 3:
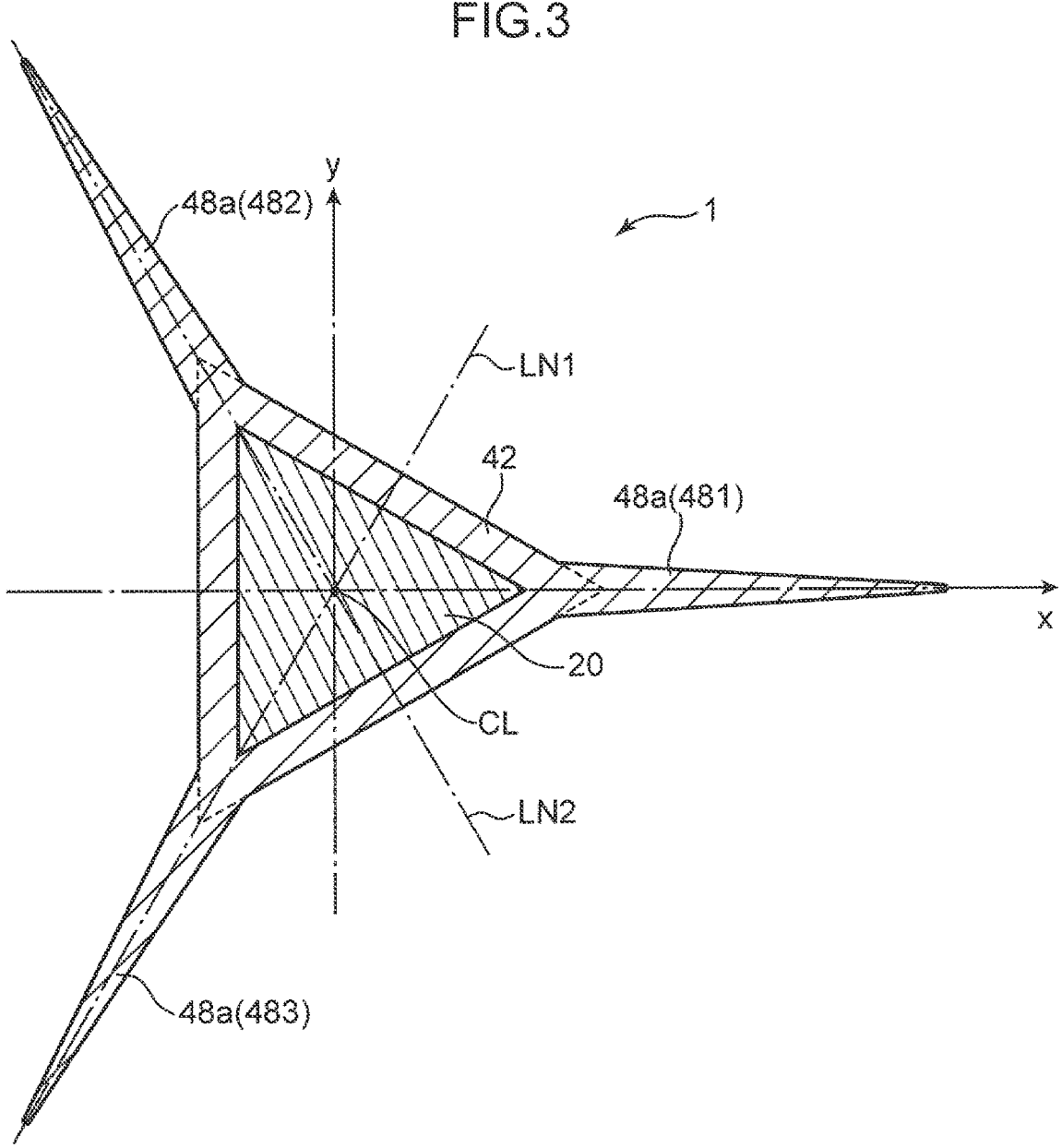
FIG. 3 is a schematic cross-sectional view of the interdental cleaning tool on an orthogonal plane taken within a covered section of the interdental cleaning tool.

The location of the bristle 48a related to the triangular shape of the cross-section of the shaft portion 20 will be described with reference to FIG. 3. FIG. 3 is a schematic cross-sectional view of the interdental cleaning tool 1 on an orthogonal plane taken within the covered section 22.

One of two triangles illustrated in FIG. 3 indicates a schematic cross-section of the shaft portion 20 on the orthogonal plane. The other triangle (that is, the triangle illustrated to surround the triangle indicating the cross-section of the shaft portion 20) indicates a schematic cross-section of the cleaning portion body 42. Vertexes of the triangle indicating the cleaning portion body 42 are drawn with a dotted line. The corner drawn with the dotted line indicates the cross-sectional shape of the cleaning portion body 42 on the orthogonal plane taken at a location of the axial direction at which no bristle 48a is connected. At a portion where the bristle 48a is connected, the cleaning portion body 42 is integrated with the bristle 48a, and thus the corner drawn with the dotted line cannot be seen.

To describe the shape of the cleaning portion body 42, two virtual lines LN1 and LN2 are illustrated in FIG. 3. The shaft portion 20 is drawn so that the three vertexes of the triangular cross-section of the shaft portion 20 covered by the cleaning portion body 42 are respectively on the line LN1, the line LN2, and the x-axis. Similar to the cross-section of the shaft portion 20, the three vertexes of the cross-section of the cleaning portion body 42 are respectively on the line LN1, the line LN2, and the x-axis. That is, the cleaning portion body 42 covers the shaft portion 20 so that the three ridge lines of the cleaning portion body 42 are defined on three virtual planes each encompassing the central axis CL and the ridge line of the shaft portion 20 (that is, the three virtual planes defined by moving the x-axis, the line LN1, and the line LN2 along the extending direction of the central axis CL).

As a plurality of bristles 48a protruding outward from the cleaning portion body 42, three bristles 481, 482, and 483 are illustrated in FIG. 3. The bristle 481 protrudes outward from one of the three ridge lines on the outer circumferential surface of the cleaning portion body 42 (that is, the ridge line on the x-axis). The bristle 482 protrudes outward from another one of the three ridge lines on the outer circumferential surface of the cleaning portion body 42 (that is, the ridge line on the line LN2). The last bristle 483 protrudes outward from the last one of the three ridge lines on the outer circumferential surface of the cleaning portion body 42 (that is, the ridge line on the line LN1). The bristles 481, 482, and 483 each become thinner toward the direction away from the outer circumferential surface of the cleaning portion body 42. The bristles 481, 482, and 483 each may have an approximately conical shape.

When the user cleans the triangular space defined between two adjacent posterior teeth, the bristles 482 and 483 are suitably used to clean the vertexes of the triangular space defined by the roots of the posterior teeth and the gum. Meanwhile, the bristle 481 is suitably used to clean a border between the two posterior teeth. Cleaning the triangular space with the interdental cleaning tool 1 will be described with reference to FIG. 4.

Figure 4:
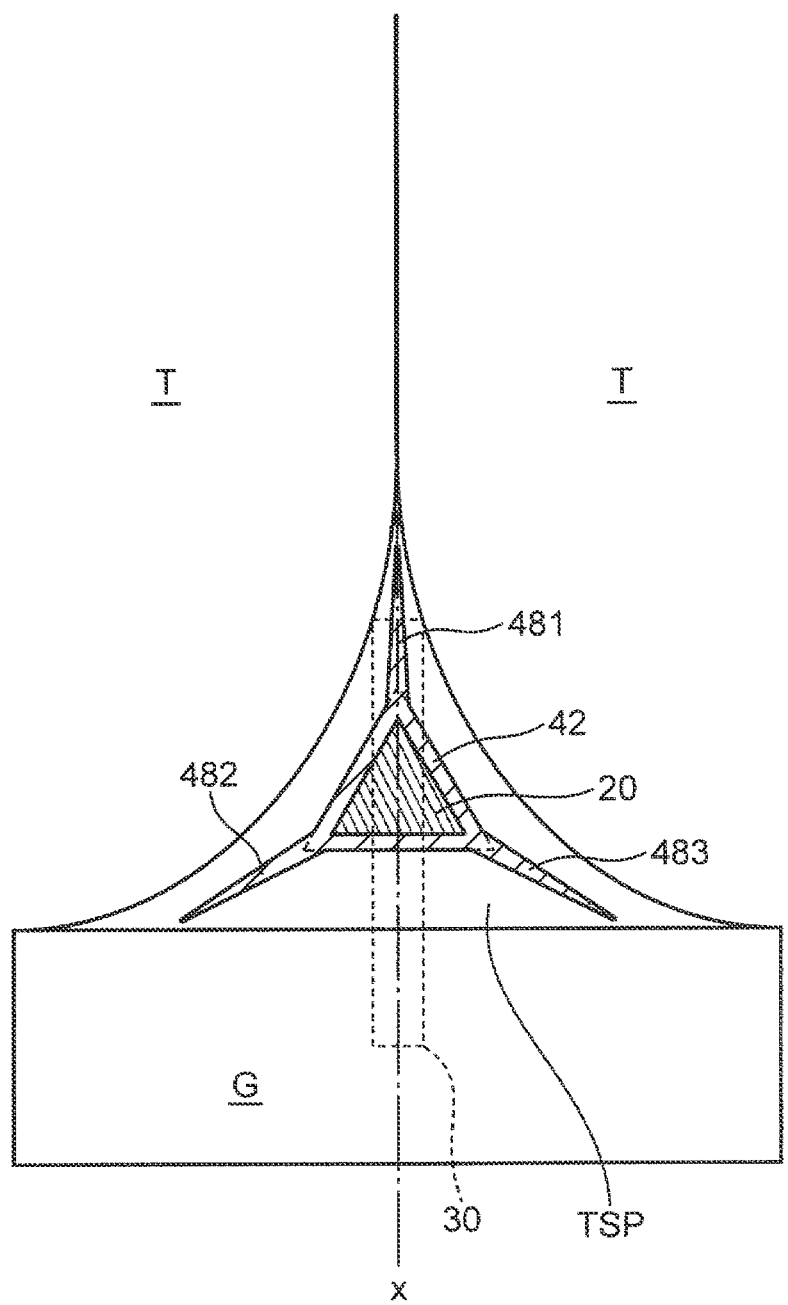
FIG. 4 is a schematic cross-sectional view of the interdental cleaning tool inserted in a triangular space.

FIG. 4 is a schematic cross-sectional view of the interdental cleaning tool 1 inserted in a triangular space. A positional relationship between the triangular space and the portion of the interdental cleaning tool 1 will be described with reference to FIG. 4.

In addition to the interdental cleaning tool 1, FIG. 4 illustrates the two posterior teeth T and the gum G. These form a triangular space TSP. Triangular cross-sections of the shaft portion 20 and the cleaning portion body 42 are drawn inside the triangular space TSP. Since the cross-sections approximately match the shape of the triangular space, the space between the outer circumferential surface of the cleaning portion body 42 and the oral tissues (that is, the two posterior teeth T and the gum G) forming the triangular space is not excessively large. Thus, the cleaning portion body 42 contacts the deposit on the oral tissues, and the deposit is scraped out from the oral tissues.

The vertexes of the triangular space TSP defined by the oral tissues are portions which are least cleanable and the most susceptible to accumulation of deposit in the triangular space TSP. The deposit accumulated in the vertexes of the triangular space TSP are effectively scraped out by the bristles 481, 482, and 483. How the bristles 481, 482, and 483 work will now be described.

The bristle 481 extends along the x-axis. In the first direction along the x-axis, the grip portion 30 (illustrated in a dotted square in FIG. 4) has a large dimension. Typically, when cleaning the triangular space TSP between the two posterior teeth T, a user holds the grip portion 30 so that the first direction is vertical. Thus, the bristle 481 extending along the x-axis abuts the border between the posterior teeth T, and the deposit between the posterior teeth T is effectively scraped out.

When the bristle 481 is protruding toward the border between the two posterior teeth T, the bristles 482 and 483 protrude toward the vertexes each defined by the root of the posterior tooth T and the gum G. Thus, the bristles 482 and 483 each abuts the vertex defined by the root of the posterior tooth T and the gum G, and the deposit in the vertexes at the root of the posterior tooth T can be effectively scraped out.

The shaft portion 20 and the cleaning portion body 42 inserted in the triangular space TSP with the bristles 481, 482, and 483 each have a triangular cross-section approximately matching the triangular space TSP, so that the user can easily insert the interdental cleaning tool 1 in the triangular space TSP. In addition, the triangular cross-sections of the shaft portion 20 and the cleaning portion body 42 take up the most of the area of the triangular space TSP, so that a large region of the outer circumferential surface of the cleaning portion body 42 is likely to contact the oral tissues. This is likely to cause scraping out of the deposit from the oral tissues by the outer circumferential surface of the cleaning portion body 42. Since the cross-section of the cleaning portion body 42 approximately matches the shape of the triangular space TSP, the outer circumferential surface of the cleaning portion body 42 can contact the oral tissues with an approximately uniform force, and this avoids locally causing an excessive irritation.

Since the cross-section of the shaft portion 20 covered by the cleaning portion body 42 with an approximately uniform thickness is approximately an isosceles triangle, the cross-section of the cleaning portion body 42 also has approximately an isosceles triangle. When the interdental cleaning tool 1 is inserted in between the two posterior teeth T so that two legs of the isosceles triangle of the cross-section of the cleaning portion body 42 contact the side surfaces of the posterior teeth T, regions of the outer circumferential surface of the cleaning portion body 42 in correspondence to these legs can contact the side surfaces of the posterior teeth T with an approximately uniform force. As a result, the interdental cleaning tool 1 can approximately uniformly clean the side surfaces of the posterior teeth T.

The outer circumferential surface of the cleaning portion body 42 can be suitably used for scraping out the deposit from the side surface of the teeth, whereas the bristles 481, 482, and 483 are suitable for scraping out the deposit from the vertexes of the triangular space TSP as described above. Although only the bristles 481, 482, and 483 are illustrated in FIG. 3 as a plurality of bristles 48a, it is preferable that a plurality of bristles 48a is provided at intervals on each of the three ridge lines of the outer circumferential surface of the cleaning portion body 42 to form bristle lines along the ridge lines. By the user moving the interdental cleaning tool 1 back and forth toward the inside and the outside of the oral cavity, a plurality of bristles 48a forming the bristle lines intermittently abuts the border or the roots of the teeth, and can effectively scrape out the deposit from the vertexes of the triangular space TSP.

The protruding directions of the bristles 481, 482, and 483 (that is, the posture of the cross-sections of the shaft portion 20 and the cleaning portion body 42) are determined based on the shape of the grip portion 30. When the user holds the grip portion 30 so that the first direction in which the grip portion 30 has a large dimension is vertical and inserts the cleaning portion body 42 in the triangular space TSP defined by the two posterior teeth T and the gum G, the bristle 481 protruding upward can effectively scrape out the deposit from between the two posterior teeth. The bristles 482 and 483 each protruding toward the corner of the triangular space TSP defined by the root of the posterior tooth and the gum G can effectively scrape out the deposit from around the roots of the posterior teeth.

The bristles 481, 482, and 483 and the cleaning portion body 42 made of a composite material containing elastomer and a reinforcing material are able to elastically deform easily while the user cleans the triangular space TSP and has a suitable rigidity to scrape out the deposit. This also contributes to improvement of the effect of cleaning the triangular space TSP.

In the embodiment described above, FIG. 3 illustrates the bristles 481, 482, and 483 protruding outward from the vertexes of the triangular cross-section of the cleaning portion body 42. However, the bristles 48a may protrude outward from locations on the sides of the triangle of the cross-section of the cleaning portion body 42.

In the embodiment described above, the bristles 481, 482, and 483 protrude outward from the cleaning portion body 42 on the same orthogonal cross-section (see FIG. 3). However, the bristles protruding from the ridge lines of the cleaning portion body may be in different locations regarding the axial direction.

In the embodiment described above, the bristles 48a and the cleaning portion body 42 are each made of a composite material containing elastomer and a reinforcing material. However, the bristles and the cleaning portion body may be made only of elastomer.

In the embodiment described above, the cleaning portion body 42 partially covers the shaft portion 20. However, the cleaning portion body may cover the entire shaft portion.

In the embodiment, the shaft portion 20 generally has a shape of a truncated triangular pyramid. However, the shaft portion may have a triangular cross-section only in the covered section covered by the cleaning portion body and a cross-section of a different shape in the other section, that is, the exposed section.

In the embodiment described above, the interdental cleaning tool 1 is used for cleaning the triangular space between the posterior teeth T. However, the interdental cleaning tool 1 can be suitably used also for cleaning a triangular space defined by teeth other than posterior teeth.

Second Embodiment

The cross-section of the cleaning portion body 42 described for the first embodiment is approximately a triangle. However, the cleaning portion body may have a circular cross-section. An interdental cleaning tool including a cleaning portion body having a circular cross-section will be described as the second embodiment.

Figure 5:
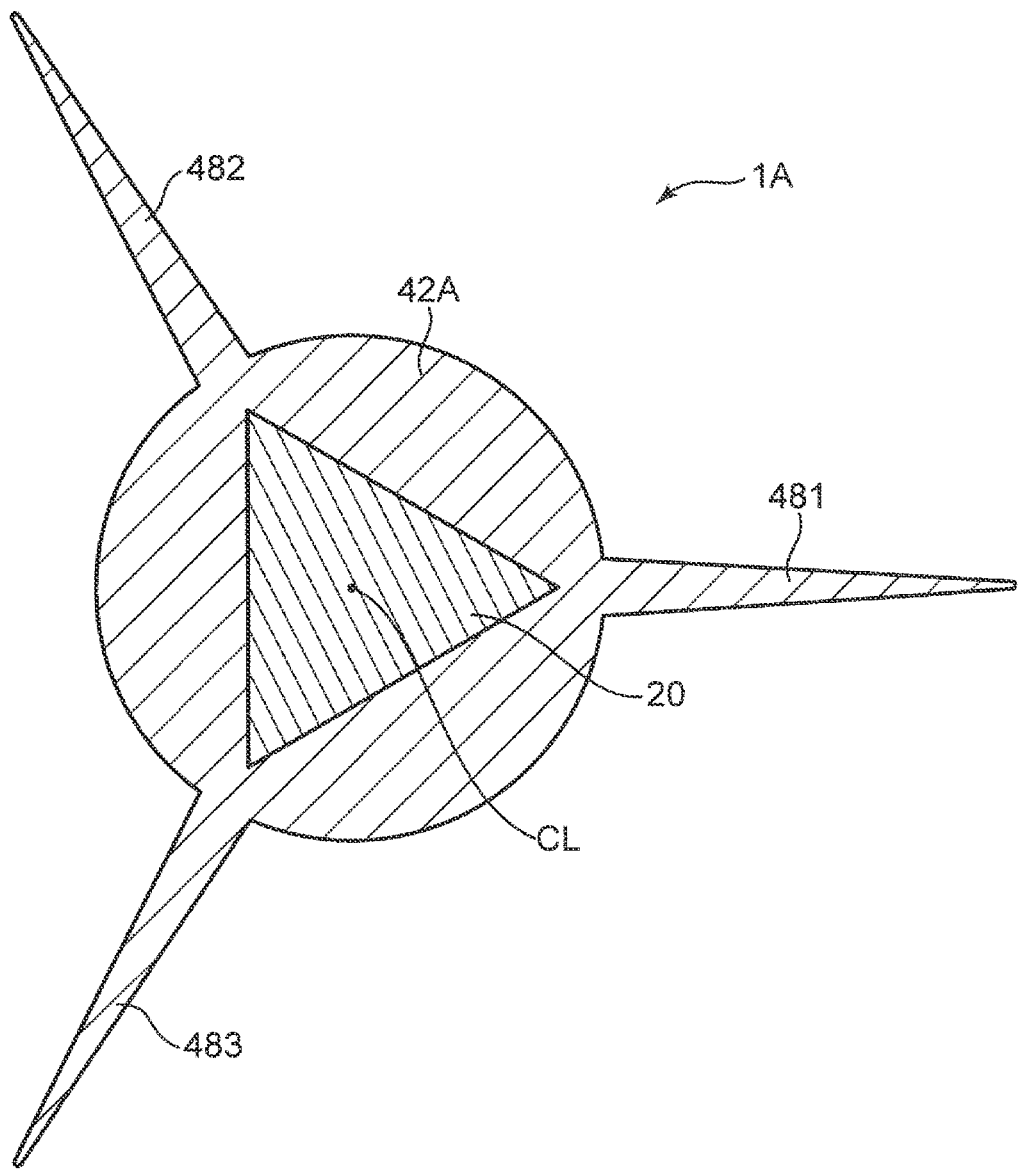
FIG. 5 is a schematic cross-sectional view (cross-sectional view on the orthogonal plane) of the interdental cleaning tool according to the second embodiment.

FIG. 5 is a schematic cross-sectional view (cross-sectional view in the orthogonal plane) of the interdental cleaning tool 1A according to the second embodiment. With reference to FIGS. 3 to 5, the interdental cleaning tool 1A will be described.

The interdental cleaning tool 1A includes a cleaning portion body 42A corresponding to the cleaning portion body 42 described with reference to FIG. 3. Structures and locations of portions other than the cleaning portion body 42A are common to those of the interdental cleaning tool 1 of the first embodiment. Thus, the description on the first embodiment can be applied as reference to the portions other than the cleaning portion body 42A.

The cleaning portion body 42A is different from the cleaning portion body 42 described with reference to the first embodiment only in the shape of the cross-section on the orthogonal plane. Thus, the description on the first embodiment can be applied as reference to the features other than the shape of the cross-section of the cleaning portion body 42A (for example, the composition of the cleaning portion body 42A).

The cleaning portion body 42A has approximately a circular cross-section. The center of the circle of the cross-section of the cleaning portion body 42A approximately matches the central axis CL of the shaft portion 20. Thus, the thickness of the resin layer forming the cleaning portion body 42A is the thickest at a center of the side of the triangle of the cross-section of the shaft portion 20 and the thinnest at a corner of the triangle. The portion with a thick resin layer abuts relatively strongly against the side surface of the posterior tooth T and the gum G described with reference to FIG. 4, and can effectively remove the deposit from the oral tissues. In addition, the thick resin layer relatively susceptible to compressional deformation does not cause an excessive irritation to the oral tissues. Since the thick resin layer compressively deforms when the user inserts the cleaning portion body 42A in the triangular space TSP (see FIG. 4), the cross-section of the cleaning portion body 42A deforms from a circle to a triangle approximately similar to the triangle of the cross-section of the shaft portion 20. That is, the cross-section of the cleaning portion body 42A compressively deforms into a shape similar to the shape of the cross-section of the cleaning portion body 42 described with reference to FIG. 1. Thus, the cross-section of the cleaning portion body 42A compressively deforms to approximately match the shape of the triangular space TSP, so that the cleaning portion body 42A can easily be inserted in the triangular space TSP.

Since the cross-section of the cleaning portion body 42A compressively deforms into the shape similar to the shape of the cross-section of the cleaning portion body 42 described with reference to FIG. 1, the user can use the interdental cleaning tool 1A in a similar operative mode as the interdental cleaning tool 1 of the first embodiment. Thus, the triangle of the cross-section of the shaft portion 20 takes a posture relative to the triangular space TSP as illustrated in FIG. 4. In this case, the thin resin layers covering the vertexes of the triangular cross-section of the shaft portion 20 are disposed at locations corresponding to the vertexes of the triangular space TSP. Since the thin resin layer not susceptible to compressive deformation is not likely to directly contact the oral tissues forming the triangular space TSP, the oral tissues do not get an excessive irritation. Since the bristles 481, 482, and 483 protrude from the locations corresponding to the thin resin layers, the vertexes of the triangular space TSP are effectively cleaned by the bristles 481, 482, and 483 as described with reference to the first embodiment.

The term "triangle" used in the description above means not only a geometric triangle but also various shapes that can visually be recognized as a triangle. For example, the vertexes on the x-axis, the line LN1, and the line LN2 illustrated in FIG. 3 may be somewhat rounded or truncated. The three surfaces between the bristles 481, 482, and 483 illustrated in FIG. 3 (three surfaces of each of the shaft portion and the cleaning portion body) may not be flat. For example, the surfaces may be curved inward on a virtual plane perpendicularly intersecting the central axis CL (that is, have a concave shape toward the central axis CL) or curved to bulge outward toward the opposite direction. Alternatively, obtuse angles may be defined at the center of the three sides appearing on a virtual plane perpendicularly intersecting the central axis CL.

INDUSTRIAL APPLICABILITY

The structure of the embodiment described above can suitably be used in a field of oral health.

REFERENCE SIGNS 1, 1A interdental cleaning tool
10 base portion
20 shaft portion
30 grip portion
40 cleaning portion
42, 42A cleaning portion body
48 brush portion
48a, 481, 482, 483 bristle
TSP triangular space (interdental space)

The invention claimed is:
1. An interdental cleaning tool comprising:
a base portion including a shaft portion having a shape insertable in an interdental space; and
a cleaning portion including a cleaning portion body that covers at least a portion of the shaft portion and is capable of cleaning an interdental space, the cleaning portion body having a lower hardness than the shaft portion and being compressively deformable,
wherein the shaft portion has a triangular cross-section on an orthogonal plane perpendicularly intersecting an axial direction of the shaft portion, characterized in that the cleaning portion body has a circular cross-section on the orthogonal plane,
wherein the shaft portion has an isosceles triangular cross section on the orthogonal plane, wherein the base portion includes a grip portion that is connected to the shaft portion and has a shape that can be held by fingers, wherein the grip portion has a larger dimension in a first direction perpendicularly intersecting the axial direction than in a second direction perpendicularly intersecting both the axial direction and the first direction, and wherein one of three sides of the triangle of the cross-section of the shaft portion is perpendicularly intersecting the first direction.

2. The interdental cleaning tool according to claim 1, wherein the cleaning portion is made of a composite material containing elastomer and a reinforcing material.

3. An interdental cleaning tool, comprising:
a base portion including a shaft portion having a shape insertable in an interdental space; and
a cleaning portion including a cleaning portion body that covers at least a portion of the shaft portion and is capable of cleaning an interdental space, the cleaning portion body having a lower hardness than the shaft portion and being compressively deformable, wherein the shaft portion has a triangular cross-section on an orthogonal plane perpendicularly intersecting an axial direction of the shaft portion, characterized in that the cleaning portion body has a circular cross section on the orthogonal plane, wherein the cleaning portion further includes a brush portion having a shape protruding outward from an outer circumferential surface of the cleaning portion body, and wherein the brush portion includes a plurality of bristles protruding outward from the outer circumferential surface of the cleaning portion body in only three directions from the central axis of the shaft portion toward three vertexes of the triangular cross-section of the shaft portion.

* * * * *